United States Patent [19]

Mallory

[11] Patent Number: 5,372,084

[45] Date of Patent: Dec. 13, 1994

[54] AERATION APPARATUS FOR AQUATIC LIFE, AQUATIC LIFE TRANSPORT VEHICLE, AND AQUATIC LIFE TRANSPORT METHOD

[76] Inventor: Brent E. Mallory, #1 Western Dr., St. Albans, W. Va. 25177

[21] Appl. No.: 44,999

[22] Filed: Apr. 9, 1993

[51] Int. Cl.$^5$ ............................................. B63B 35/14
[52] U.S. Cl. .................................. 114/255; 114/343; 43/57
[58] Field of Search ........... 114/255, 343, 364, 183 R; 43/57; 119/201, 202, 203

[56] References Cited

U.S. PATENT DOCUMENTS

| | | | |
|---|---|---|---|
| 2,151,225 | 3/1939 | Newton | 114/183 R |
| 2,664,241 | 12/1953 | Sunday | 114/183 R |
| 2,877,701 | 3/1959 | Whitaker | 114/183 R |
| 3,822,498 | 7/1974 | Butler . | |
| 3,870,008 | 3/1975 | Wilkerson | 114/183 R |
| 4,074,651 | 2/1978 | Arduser | 114/255 |
| 4,166,086 | 8/1979 | Wright . | |
| 4,222,549 | 9/1980 | Lindgren | 254/93 H P |
| 4,829,698 | 5/1989 | McDonald . | |
| 4,936,043 | 6/1990 | Steele . | |
| 4,970,982 | 11/1990 | Martin | 114/343 |
| 4,994,177 | 2/1991 | Bogar, Jr. . | |

FOREIGN PATENT DOCUMENTS 536068 4/1922 France ...................... 114/255

Primary Examiner—David M. Mitchell
Assistant Examiner—Stephen P. Avila
Attorney, Agent, or Firm—Spencer D. Conard

[57] ABSTRACT

An aeration apparatus for keeping aquatic life alive includes a container for containing a body of water, aquatic life, and an air space. The aeration apparatus is designed for transport in a vehicle receiving locomotive power from an internal combustion engine having a vacuum line. The aeration apparatus has an exhaust tube which has an inlet in the air space and an outlet connected to the vacuum line for drawing air from the air space into the vacuum line thereby creating subatmospheric pressure in the air space. The apparatus also has an air tube which has an outlet in the water body and an inlet in the atmosphere. The method for transporting aquatic life involves providing means for fluid communication between the vacuum line and the air space, providing means for fluid communication between the atmosphere and the water body, and drawing air from the air space to the vacuum line in amounts sufficient to create a pressure differential between the air space and the atmosphere sufficient to cause air to flow from the atmosphere into the water body thereby generating air bubbles in the water body and oxygenating the air. The apparatus, vehicle and method are useful for long distance transport of aquatic life.

13 Claims, 2 Drawing Sheets

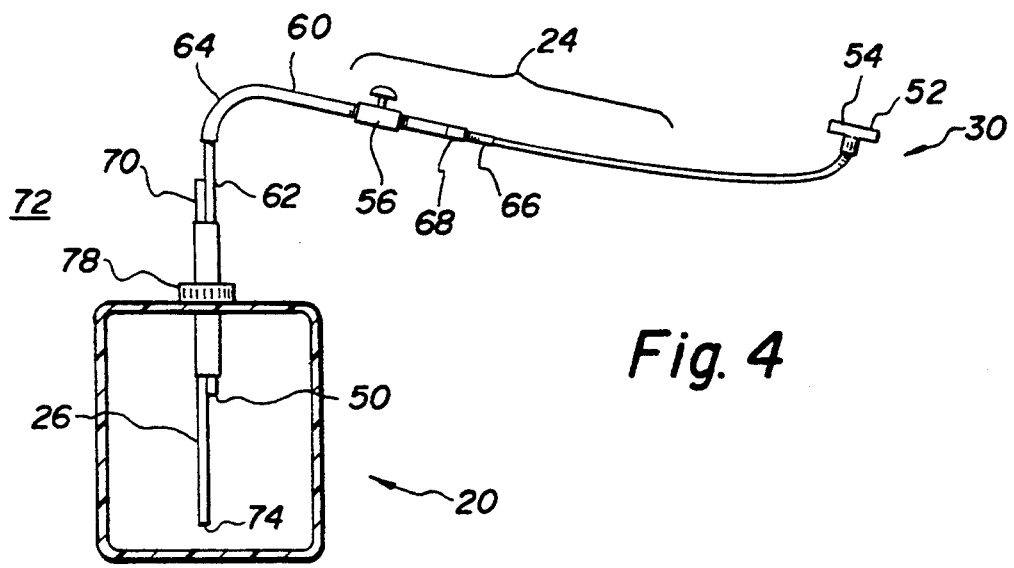
Fig. 4
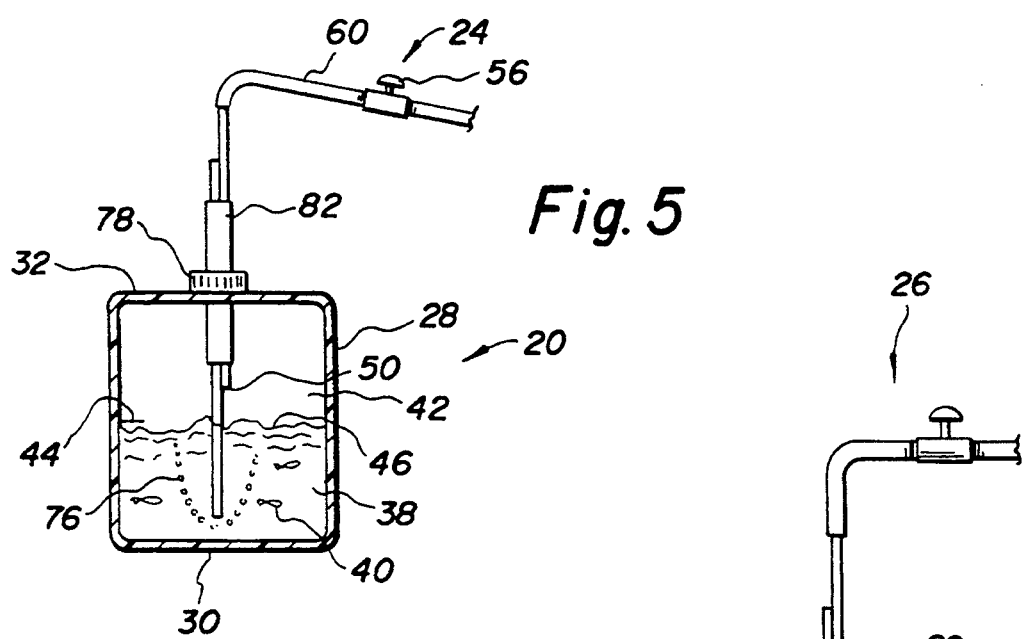
Fig. 5
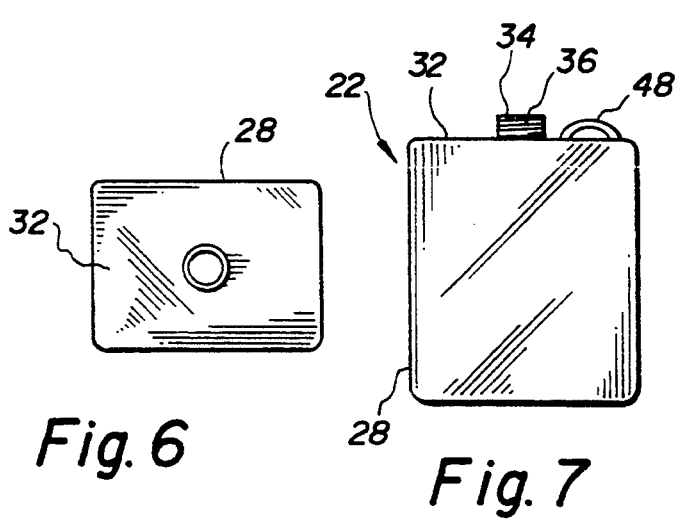
Fig. 6
Fig. 7
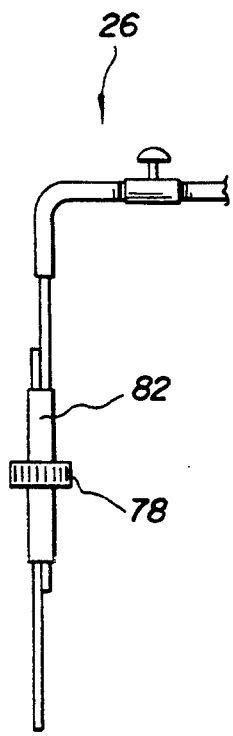
Fig. 8

AERATION APPARATUS FOR AQUATIC LIFE, AQUATIC LIFE TRANSPORT VEHICLE, AND AQUATIC LIFE TRANSPORT METHOD

BACKGROUND OF THE INVENTION

1. Field of the Invention

This invention relates to aeration devices and more particularly to aeration devices for transport of aquatic life in vehicles powered by internal combustion engines, transport vehicles and methods for transporting aquatic life.

2. Description of the Related Art

Various forms of water aeration devices have previously been disclosed such as those set out in McDonald, U.S. Pat. No. 4,829,698, issued May 16, 1989, Wright, U.S. Pat. No. 4,166,086, issued Aug. 28, 1979, Steele, U.S. Pat. No. 4,936,043, issued Jun. 26, 1990, Bogar, Jr., U.S. Pat. No. 4,994,177, issued Feb. 19, 1991, and Butler, U.S. Pat. No. 3,822,498, issued Jul. 9, 1974, all of which are incorporated herein by reference.

Applicants have discovered that problems exist with prior aeration devices during long distant (long time period, for example, greater than one hour) transport of aquatic life. The problems can result in the death of the aquatic life being transported in these prior aeration devices. For example, many of these prior aeration devices rely on batteries for their operation which can become depleted after extended use, or rely on solar cells which fail to generate power in the absence of sunlight. Another problem with these prior devices is that they require the expense and maintenance of mechanical units, such as pumps, separate from that of the transport vehicle in order to obtain the desired aeration. Furthermore, typically these devices lack means for directly controlling the air flow during aeration. In other words, many prior aeration devices suffer from one or more of the following problems: (1) they utilize their own power source separate from that of the vehicle resulting in additional cost and limited energy reserves, (2) aeration devices powered by batteries lack insufficient power reserves for extended aeration times, (3) the use of electrical power devices in the presence of water can, depending on the source of the electrical power, add unnecessary risk of electric shock, (4) solar based power sources fail to generate power in the absence of sunlight, for example, nighttime transport or transport during cloudy weather, (5) prior devices typically utilize a means for moving air which is separate from the internal combustion engine of the transport vehicle, for example, prior aeration devices used air pumps, thus resulting in additional cost, additional maintenance and additional risk of mechanical failure, and (6) typically these prior devices lack means for directly controlling the air flow into the water contained, thereby limiting the ability of the operator to directly control the desired amount of air flow into the water containing the aquatic life.

Accordingly, there is a need for aeration devices which do not require a separate power source from the internal combustion engine of the transport vehicle, which do not require the use of electrical power for their operation, and which do not require a means for moving air separate from the internal combustion engine of the transport vehicle.

SUMMARY OF THE INVENTION

The aeration apparatus of this invention solves the above problems and meets the above needs when used for the transport of aquatic life in a vehicle which receives locomotive power from an internal combustion engine having a vacuum line. The apparatus has a container which during use contains a body of water which has aquatic life therein and contains an air space above the body of water. The apparatus further has an exhaust tube which has an inlet located in the air space and an outlet which is connected to the vacuum line for permitting air to be drawn from the air space through the tube and into the vacuum line during the operation of the vehicle. The apparatus also has an aeration tube which has an inlet located in atmospheric air external of the container and an outlet located beneath the surface of the body of water. During operation of the vehicle, the internal combustion engine creates a vacuum in the vacuum line which draws air from the air space through the exhaust tube into the vacuum tube thereby creating subatmospheric pressure in the air space which in turn causes the atmospheric pressure external of the container to force air into the inlet of the aeration tube, through the aeration tube and out the outlet of the aeration tube into the body of water thereby creating air bubbles in the body of water which thereby oxygenates the body of water. Preferably, the container is completely sealed from air movement except for air movement through the exhaust tube and the aeration tube. The aeration apparatus provides a greatly simplified and increasingly reliable system for extended aeration of aquatic life during transport thereof, and neither requires an independent power source nor a independent means for moving the air from that provided by the internal combustion engine of the transport vehicle. The present invention further provides an aquatic life transport vehicle utilizing the aeration apparatus, and further provides a greatly simplified method for keeping aquatic life alive during transport in a vehicle receiving locomotive power from an internal combustion engine.

BRIEF DESCRIPTION OF THE DRAWINGS

FIG. 4 is a side elevational view of the apparatus of the present invention wherein the side wall of the container is cutaway for viewing;

FIG. 5 is a side elevational cutaway view of the apparatus in operation, wherein the internal operation of the container can be viewed;

FIG. 6 is a top plan view of the container;

FIG. 7 is a side elevational view of the container; and

FIG. 8 is a side elevational view of a lid having a collar which holds an exhaust tube and a flexible section of a portable segment of an exhaust tube.

DETAILED DESCRIPTION OF THE DRAWINGS

Figure 1:
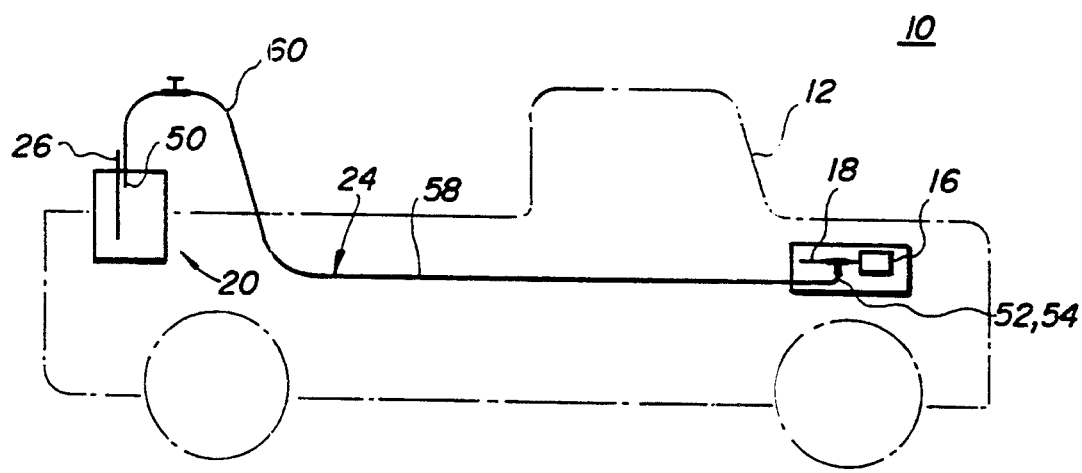
FIG. 1 is a side elevational, schematic view of transport vehicle of the present invention in the form of a truck.
Figure 2:
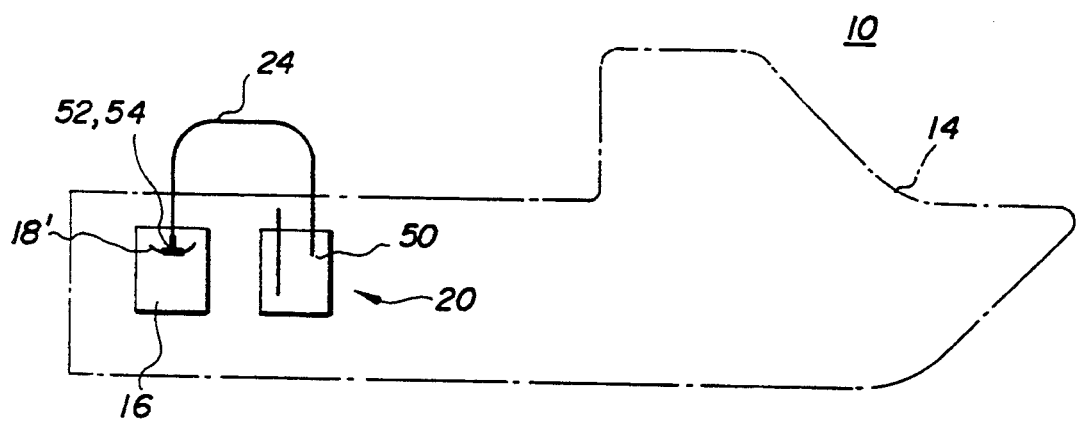
FIG. 2 is a side elevation, schematic drawing of a transport vehicle according to the present invention in the form of a boat.
Figure 3:
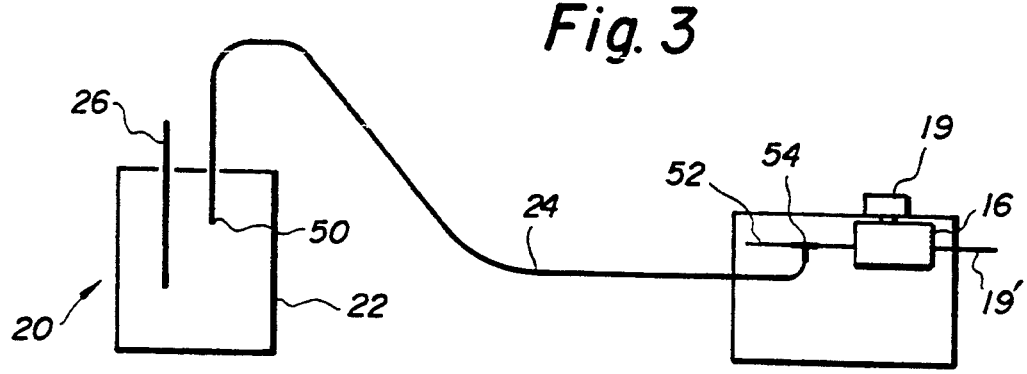
FIG. 3 is a schematic side elevational view of the apparatus of the present invention connected to a vacuum line of an internal combustion engine.

A preferred embodiment of the present invention is specifically shown in the drawings. Referring now to the drawings, there is illustrated in FIGS. 1 and 2, vehicles (10) for transporting aquatic life, specifically FIG. 1 illustrates a schematic drawing of a truck (12) suitable for transporting aquatic life according to the present invention, and FIG. 2 schematically illustrates a boat (14) suitable for transporting aquatic life according to the present invention. The vehicles (10) have internal combustion engines (16) for powering locomotion of the vehicles (10). The engines (16) each having means for generating a vacuum associated with normal operation of the engine (16). Typically the means for generating the vacuum is the engine (16) itself wherein the action of the pistons in the cylinder (not shown, but well known) creates a vacuum therein which may be accessed at a carburetor (19) or at an intake manifold (19'). The vacuum line (18, 18') associated with car engine (16) are well known, and are in gaseous communication with the intake manifold (19') or the carburetor (19) which in turn is in gaseous communication with the cylinders of the engine (16) in a suitable fashion to create a vacuum in the vacuum lines (18, 18') thereby drawing air from the vacuum lines (18, 18') into the carburetor (19) or intake manifold (19'). In normal operation of internal combustion engines (16) for vehicles (10), the vacuum in the vacuum lines (18, 18') are used to activate sensors, release emergency brakes, assist in the operation of the transmission, or serve to activate elements of the air conditioning system of the vehicle (10).

As shown in FIGS. 1, 2, 3, 4 and 5, an aeration apparatus (20) comprises a container (22), an exhaust tube (24) and an aeration tube (26).

The container (22) has side walls (28), which may be vertical planar surfaces, for example, as illustrated four vertical walls are interconnected to form a container which is rectangular in horizontal cross section, optionally the side wall (28) could be a single unit which is cylindrical in form and which is circular in horizontal cross section. The container further comprises a bottom (30) which is formed at the lower terminal end of the side walls (28), and a top (32) which is formed at the upper terminal ends of side walls (28). The container (22) has a threaded throat (34) which contains threads (36).

During use of the container (22), the container (22) as illustrated in FIG. 5, contains a body of water (38) which fills a lower portion of the container (22) and contains aquatic life (40) therein. The container (22) further contains an air space (42) above the surface (46) of the body of water (38). Preferably the container has a mark on one or more of the side walls (28) which serves as a fill line (44) for indicating to a user of the container (22) the desired level of water in the container (22) so that the surface (46) of the body of water (38) is approximately at the same level as the fill line (44). Preferably the container (22) has a handle (48) as shown in FIG. 7 in order to facilitate manual carrying of the container (22) from the vehicle (10) to the desired fishing spot following successful transport of the aquatic life.

The exhaust tube (24), as best illustrated in FIGS. 4 and 5, has an inlet (50) which is positioned in the air space (42), above the fill line (44), and further has an outlet (52) which is preferably formed by a t-shaped connector (54) for fluid communication with and connection to the vacuum line (18, 18'). Some internal combustion vehicles (10) run a main vacuum line (18, 18') to a vacuum bottle (not shown) which has numerous ports for the attachments of small vacuum lines (18, 18') thereto, and the reference to a t-shaped connector (54) is not meant to limit the scope of the possible means of connection to and communication with the vacuum line (18, 18') by the exhaust tube (24). The exhaust tube (24) further contains a manually actuatable air control valve (56) for controlling the flow of air through the exhaust tube (24). The exhaust tube (24) preferably comprises an installed upstream segment (58) which has the outlet (52) and is connected to and in fluid communication with the vacuum line (18, 18'), and further contains a portable downstream segment (60) which has a rigid section (62) and a flexible section (64). The installed upstream segment (58) has a male couple (66) at its end opposite the outlet (52). The male couple (66) can be releasably connected with a female couple (68) of the portable downstream segment (60). The portable downstream segment (60) has the inlet (50). The flexible section (64), permits easy manipulation of the female couple (68) for positioning with the male couple (66) for connection therewith. The male couple (66) and female couple (68) interconnect to seal off the exhaust tube (24) from loss of vacuum at the coupling site.

The aeration tube (26) has an inlet (70) which is located in the atmosphere (72) exterior of the container (22) during normal operation of the apparatus (20), and has an outlet (74) which is located in the interior of the container (22), below the fill line (44) and inside the body of water so that during operation of the apparatus (20), air will be drawn from the atmospheric air (72) through the aeration tube (26) into the body of water (38) thereby forming bubbles (76) which will effectively and sufficiently oxygenate the water (38) in order to keep the aquatic life (40) alive. A lid (78) has internal threads (not shown) which effectively mate with the threads (36) of the throat (34) so that the lid (78) may be rotatably screwed on to the throat (34). The lid (78) serves to effectively seal off the container (22) from air flow except for air flow through the exhaust tube (24) and the aeration tube (26).

The container (22) may be portable so that fishermen may manually carry their live bait from the vehicle to their desired fishing spot, or may be built in to the vehicle as a bait well for boat fishing or as a live well for maintaining game fish alive.

The aquatic life (40) may be in the form of bait such as minnows, small fish or shrimp, or may be in the form of game fish, such as bass, kept alive as required by many fishing tournaments. The lid (78) contains a hermetically sealed collar (82) which holds the exhaust tube (24) and aeration tube (26) so as to limit air flow into or from the container (22) to only air flow through the exhaust tube (24) or aeration tube (26).

The container (22) may be made of any material which is suitable for containing water and which provides resistance to air flow therethrough sufficiently to allow the creation of subatmospheric pressure therein. The material for the container (22) should also be of sufficient structural strength to withstand a pressure differential between the atmosphere and a subatmospheric pressure in the air space (42) without collapsing thereof. The container (22) may be constructed of any suitable light weight, corrosion free, yet strong materials such as aluminum, fiber glass, polyethylene, polypropylene or other suitable metal or plastic or composite material. A lid (78) may be made of similar materials as listed above as well as the collar (82) may be made of materials as listed above. The exhaust tube (24) and the aeration tube (26) should also be made of materials which are of sufficient strength to avoid collapsing during creation of subatmospheric pressure within the tubes. Preferably the collar (82), the rigid section (62), and the aeration tube (26) are all made of metal, such as copper. The lid (78) is preferably made of a plastic material, such as a polyolefin, for example, polyethylene. The installed upstream segment (58) is preferably made of metal tubing, preferably copper tubing. The flexible section (64), is preferably made of rubber hosing, such as is commonly used for vacuum lines (18, 18') for internal combustion engines (16, 16').

Preferably the aeration tube (26) and exhaust tube (24) each independently have diameters selected from between 0.1 inches and 0.6 inches, more preferably between 0.2 inches and 0.5 inches, and most preferably between 0.25 inches and 0.4 inches. Preferably the aeration tube (26) has a length of between 6 inches and 24 inches, more preferably between 8 inches and 16 inches, and most preferably between 10 inches and 14 inches. Preferably the exhaust tube (24) has a length of between 3 feet and 30 feet, more preferably between 6 feet and 20 feet, and most preferably between 10 feet and 15 feet. Preferably the container (22) has a volume between 1 gallon and 500 gallons, more preferably between 2 gallons and 50 gallons, most preferably between 4 gallons and 6 gallons. Preferably the throat has a diameter of between 3 and 6 inches.

The aeration tube (26) serves as a means for fluid communication between the atmospheric air (72) and the interior of the body of water (38) to permit air flow from the atmosphere (72) into the body of water (38). As set out above, the engine (16, 16') has means for generating a vacuum associated with the normal operation of the engine (16, 16'). The exhaust tube (24) and the vacuum line (18, 18') in combination serve as a means for fluid communication between the vacuum means and the air space (42) to cause air to flow from the air space (42) to the vacuum means provided by the engine (16, 16') due to a pressure differential between the low pressure vacuum means and the relative higher pressure air space (42). This air flow reduces the air pressure in air space (42) to below atmospheric pressure thereby creating a pressure differential between the air space (42) and the atmosphere (72) and thereby causing air to flow from the atmosphere (72) into the body of water (38) and then into the air space (42). The air pressure differential between the atmosphere and the air space (42) must be sufficient to overcome the pressure head created by the height of water between the water surface (46) and the aeration tube outlet (74).

During operation of the apparatus (20) in conjunction with the operation of the vehicle (10), a method is provided for keeping aquatic life alive in the container (22) during transport of the container (22) in the internal combustion engine powered vehicle (10), the vehicle (10) having a vacuum line (18, 18') associated with the normal operation of the engine (16, 16'), the container (22) containing a body of water (38) for the aquatic life (40) and further containing an air space (42) above an upper surface (46) of the body of water (38), the method involving (A) providing means (26) for fluid communication between atmospheric air (72) and the body of water (38) at a location beneath the upper surface (46) of the body of water (38), and (B) providing means (24) for fluid communication between the air space (72) and the vacuum line (18, 18'), (C) drawing air from the air space (42) into the vacuum line (18, 18') in amounts sufficient to create a pressure differential between the atmospheric air (72) and the air space (42) to cause air to flow from the atmosphere (72) into the body of water (38) through the means (26) into the body of water (38) to generate air bubbles (76) in the body of water (38) and thereby oxygenate the water. The air bubbles (76) flow to the surface (46) of the water body (38) and into the air space (42).

Preferably the pressure differential provided between the atmospheric air (72) and the air space (42) is between 4 inches of water and 36 inches of water, more preferably between 6 inches of water and 24 inches of water, and most preferably between 8 inches of water and 12 inches of water.

Thus, it has been described a new and unique aeration apparatus (20), vehicle for transporting aquatic life, and method for keeping a aquatic life alive in a container (22) during transport of the container (22) in an internal combustion engine (16, 16') powered vehicle (10) which is light weight, inexpensive, requires no power source independent of the internal combustion engine (16, 16'), requires no means for forcing air flow independent of the internal combustion engine (16, 16'), and which serves to keep the aquatic life alive, and thus in better condition, over longer periods of time then was usually previously possible with power systems independent from the internal combustion engine (16, 16') of the vehicle (10) itself. Although the present invention has been described in terms of preferred embodiment, it will be understood that its true spirit and scope is defined by the following claims.

What is claimed is:

1. A method for keeping aquatic life alive in a container during transport of the container in a vehicle, said vehicle having an internal combustion engine for powering locomotion of the vehicle, said engine having means for generating a vacuum associated with normal operation of the engine, said container containing a body of water for the aquatic life and further containing an air space above an upper surface of said body of water, said method comprising:

(a) providing means for fluid communication between atmospheric air and the body of water at a location beneath the surface of said body of water; and (b) providing means for fluid communication between said air space and said vacuum means; and (c) operating said engine to cause said vacuum means to create a pressure differential between the vacuum means and the air space to cause air to flow from said air space to said vacuum means in amounts sufficient to create a pressure differential between the atmosphere and said air space sufficient to cause air to flow from the atmosphere into said body of water to generate air bubbles in said body of water and thereby oxygenate said water.

2. The method of claim 1 wherein said method further comprises maintaining said pressure differential within a range of 6 inches of water to 24 inches of water.

3. A vehicle for transporting aquatic life, said vehicle comprising:

(a) an internal combustion engine for powering locomotion of the vehicle, said engine having means for generating a vacuum associated with normal operations of said engine, (b) a container for containing a body of water, aquatic life in said body of water and an air space above said body of water, (c) means for fluid communication between atmospheric air external said container and the interior of said body of water to permit air flow from the atmosphere into the body of water, (d) means for fluid communication between said vacuum means and said air space to cause air to flow from said air space to said vacuum means and thereby creating a pressure differential between the air space and the atmosphere sufficient to cause air to flow from the atmosphere into said body of water.

4. The vehicle of claim 3, wherein said means (d) has an actuatable valve for regulating the rate of air flow from the air space to the vacuum.

5. The vehicle of claim 3 wherein said vehicle is selected from the group consisting of cars, trucks and boats.

6. The vehicle of claim 3 wherein said container has a volume of between 1 gallon and 500 gallons.

7. The vehicle of claim 3 wherein said container has a volume of between 4 gallons and 6 gallons.

8. The vehicle of claim 3 wherein said means (c) and said means (d) are each independently selected from the group consisting of tubing having cross-sectional diameters of from 0.20 inches to 0.5 inches.

9. An apparatus for keeping aquatic life alive during transport in a vehicle having an internal combustion engine for powering locomotion, said engine having means for generating a vacuum during normal operations of the vehicle, said apparatus comprising:

(a) a container for containing a body of water, aquatic life, and an air space in contact with said body of water;

(b) means for fluid communication between body of water and atmospheric air, (c) means for fluid communication between said vacuum means and said air space for causing air to flow from the air space to vacuum means thereby creating a pressure differential between said air space atmospheric air thereby causing air to flow from through the means (b) from the atmosphere into the body of water to thereby generate bubbles and oxygenate the water.

10. The apparatus of claim 9 wherein said container has a volume of from 0.9 gallons to 25 gallons, said container is made from a material selected from the group consisting of plastics, glasses, and metals and fiberglass composites.

11. The apparatus of claim 10 wherein said means (b) comprises a tube having a length of between 6 inches and 24 inches, said tube being made from a material selected from the group consisting of plastics, metals and rubbers.

12. The apparatus of claim 11 wherein said means (c) comprises a tube having a length between 3 feet and 30 feet, a diameter between 0.2 inches and 0.6 inches, and is made from a material selected from the group consisting of plastic, metal and rubber.

13. The apparatus of claim 12 wherein said means (c) is connected to a vacuum line of said vacuum means by a tubular t-type connector.

* * * * *